United States Patent
Chen (10) Patent No.: US 10,156,928 B2
(45) Date of Patent: Dec. 18, 2018

(54) EXTENDED USER TOUCH INPUT

(71) Applicant: Intel Corporation, Santa Clara, CA (US)

(72) Inventor: Xin Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/121,603

(22) PCT Filed: Sep. 25, 2015

(86) PCT No.: PCT/CN2015/090763
§ 371 (c)(1),
(2) Date: Aug. 25, 2016

(87) PCT Pub. No.: WO2017/049603
PCT Pub. Date: Mar. 30, 2017

(65) Prior Publication Data
US 2017/0269761 A1    Sep. 21, 2017

(51) Int. Cl.
*G06F 3/041* (2006.01)
*G06F 9/451* (2018.01)
*G06F 3/0354* (2013.01)
*G06F 3/0488* (2013.01)

(52) U.S. Cl.
CPC ........ *G06F 3/0416* (2013.01); *G06F 3/03545* (2013.01); *G06F 3/04883* (2013.01); *G06F 9/453* (2018.02); *G06F 2203/04106* (2013.01)

(58) Field of Classification Search
CPC ............................................ G06F 3/041–3/047
USPC ...................... 178/18.01–19.07; 345/173–178
See application file for complete search history.

(56) References Cited

U.S. PATENT DOCUMENTS

| | | | |
|---|---|---|---|
| 2002/0130838 A1* | 9/2002 | Feierbach | G06F 3/04892 345/157 |
| 2009/0237357 A1* | 9/2009 | Ko | G06F 3/0488 345/157 |
| 2017/0038962 A1* | 2/2017 | Schoen | G06F 3/04883 |

FOREIGN PATENT DOCUMENTS

| | | |
|---|---|---|
| CN | 101840287 A | 9/2010 |
| CN | 103106040 A | 5/2013 |
| CN | 103902217 A | 7/2014 |
| JP | 2011248443 A | 12/2011 |

OTHER PUBLICATIONS

International Search Report and Written Opinion dated Jun. 30, 2016 for International Application PCT/CN2015/090763, 13 pages.

* cited by examiner

*Primary Examiner* — Michael Pervan
(74) *Attorney, Agent, or Firm* — Schwabe, Williamson & Wyatt, P.C.

(57) ABSTRACT

Apparatuses, methods and storage medium associated with extended user touch input are disclosed herein. In embodiments, an apparatus may include a touch input driver to detect and report user touch inputs through a touch-sensitive screen of the apparatus. Further, the touch input driver is to provide support for user touch input at an extended point or area of the touch-sensitive screen beyond an actual touch point or area of the touch-sensitive screen. Other embodiments may be described and/or claimed.

14 Claims, 6 Drawing Sheets

EXTENDED USER TOUCH INPUT

CROSS REFERENCE TO RELATED APPLICATIONS

The present application is a national phase entry under 35 U.S.C. § 371 of International Application No. PCT/CN2015/090763, filed Sept. 25, 2015, entitled "Extended User Touch Input", which designated, among the various States, the United States of America. The Specification of the PCT/CN2015/090763 Application is hereby fully incorporated by reference.

TECHNICAL FIELD

The present disclosure relates to the field of computing. More particularly, the present disclosure relates to extended user touch input methods and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in computing, networking, cellular and related technologies, mobile computing devices, such as tablets and smart phones, have become ubiquitous. Further, larger size of many traditional small size hand held mobile computing devices, such as smart phones, are becoming increasingly popular. For example, Apple Computer of Cupertino, Calif. offers an iPhone6, the Plus model, that is 6.22 inches long and 3.06 inches wide, Samsung Computer of Seoul, Korea offers a Galaxy phone, the Notes, that is 6.03 inches long and 3.0 inches wide. However, these larger size hand held mobile computing devices are not inducive with one hand operation, especially for users with relatively small hands (or short fingers). Holding these larger size mobile computing device with one hand and operating them with the same hand have become difficult or virtually impossible for users with small hands (or short fingers).

BRIEF DESCRIPTION OF THE DRAWINGS

Embodiments for generation and animation of avatars will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with extended user touch input are disclosed herein. In embodiments, an apparatus may include a touch input driver to detect and report user touch inputs through a touch-sensitive screen of the apparatus. Further, the touch input driver may provide support for user touch input at an extended point or area of the touch-sensitive screen beyond an actual touch point or area of the touch-sensitive screen.

In embodiments, to provide support for user touch input at an extended point or area of the touch-sensitive screen beyond an actual touch point or area of the touch-sensitive screen, the touch input driver may support an extended touch input mode of operation having a displayed virtual finger. While in the extended touch input mode of operation, the touch input driver may detect for user touch input at an actual point or area of the touch-sensitive screen, determine the extended point or area of the touch-sensitive screen, and report the touch input at the extended point or area of the touch-sensitive screen. The touch input driver may determine the extended point or area of the touch-sensitive screen, based at least in part on an extent of the displayed virtual finger.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
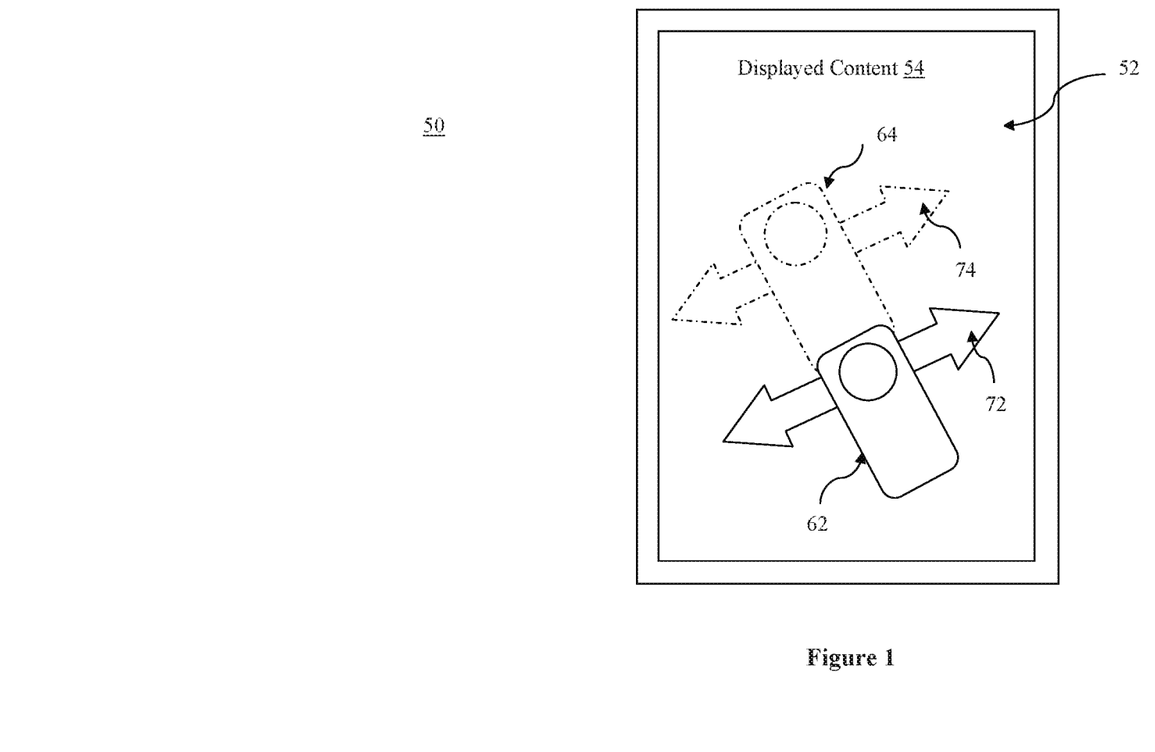
FIG. 1 illustrates a front view of a mobile computing device with extended user touch input technology of the present disclosure, according to various embodiments.

Referring now to FIG. 1, wherein a front view of a mobile computing device with extended user touch input technology of the present disclosure, according to various embodiments, is depicted. As shown, mobile computing device 50 may include a touch-sensitive screen 52. During operation, touch-sensitive screen 52 may have various output contents 54 of an operating system or applications of mobile computing device 50 displayed thereon. Further, touch-sensitive screen 52 may be used to provide user inputs to the operating system and/or applications, through interaction with displayed content 54. Examples of contents 54 may include but are not limited text, graphics, images, and so forth. Some of these text, graphics, images, and so forth, may include links to other text, graphics, and images. Interaction with displayed content 54 may include e.g., single or double tapping with user finger 62 at various surface points or areas of touch-sensitive screen 52, sliding 72 back and forth or otherwise making various gestures such as circling, flicking, and so forth, with user finger 62, over various surface areas of touch-sensitive screen 52.

Additionally, mobile computing device 50 may support a standard touch input mode of operation and an extended touch input mode of operation. While in the standard touch input mode of operation, touch inputs, sweepings 72, tapping, and so forth, may be detected and reported as in the prior art, that is, as touch inputs at the actual touch point or area of touch-sensitive screen 52. However, while in the extended touch input mode of operation, a visual aid, such as virtual finger 64, may be displayed. Further, touch inputs, sweepings 74, tapping, and so forth, may be detected and reported as touch inputs at an extended touch point or area of touch-sensitive screen 52, based at least in part on the extent of virtual finger 64.

In embodiments, mobile computing device 50 may operate by default in the standard touch input mode of operation, and enter into the extended touch input mode of operation, in response to the user making a predetermined gesture for a predetermined amount of time, e.g., the user sweeping finger 62 over an actual point or area of touch-sensitive screen 52, without clicking or tapping, for 2 seconds. Similarly, mobile computing device 50 may exit the extended touch input mode of operation, and return to the standard touch input mode of operation, in response to the user making a predetermined gesture for a predetermined amount of time, e.g., the user triple tapping the touch-sensitive screen.

Accordingly, with the extended touch input support, a user with relatively small hand (or short finger) may still hold one of the larger mobile computing devices with one hand and operate the mobile computing device with the same hand. These and other aspects of the extended touch input technology of the present disclosure will be further described with references to remaining FIGS. 2-5.

Figure 2:
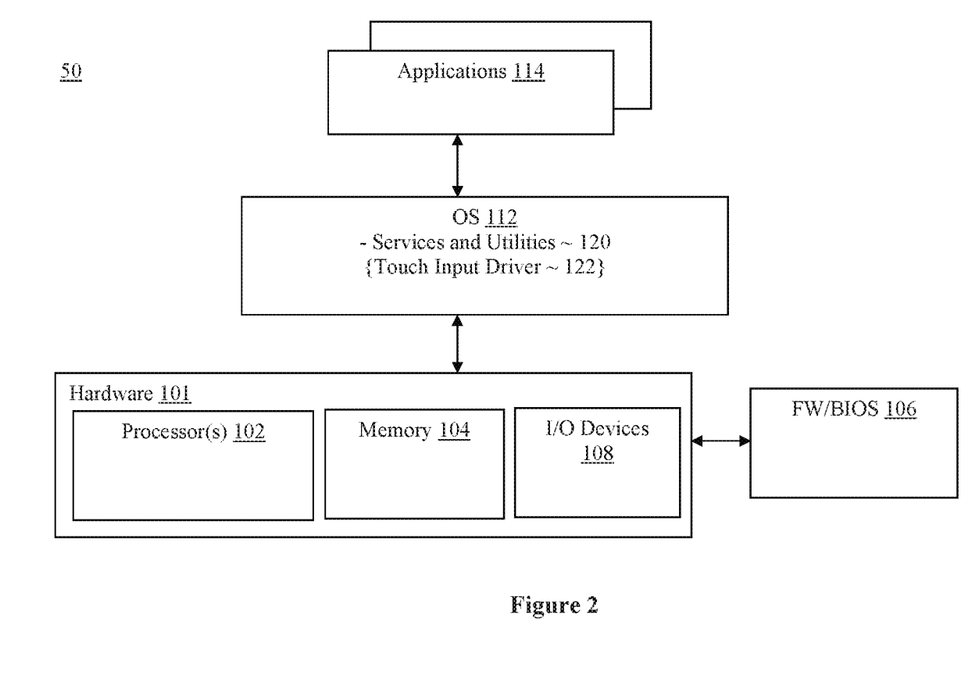
FIG. 2 illustrates example hardware and software components of the mobile computing device of FIG. 1, according to various embodiments.

Referring now to FIG. 2, wherein example hardware and software components of the mobile computing device of FIG. 1, according to various embodiments, are illustrated. As shown, in embodiments, computing device 50 may include hardware 101, firmware (FW)/basic input/output services (BIOS) 106, OS 112 and applications 114, operatively coupled with each other as shown. Hardware 101 may include one or more processors 102, memory 104 and input/output (I/O) devices 108.

OS 112 may include a number of services and utilities 120. In particular, services and utilities 120 may include touch input driver 122 configured to support the standard touch input mode of operation and the extended touch input mode of operation. In embodiments, touch input driver 122 may be configured to detect for the predetermined user gestures to transition mobile computing device 50 between the standard and extended touch input mode of operation. Additionally, touch input driver 122 may be configured to detect and report touch inputs at the actual touch point or area of touch-sensitive screen 52, while mobile computing device 50 is in the standard touch input mode of operation. Further, touch input driver 122 may be configured to provide a visual aid, such as virtual finger 64, detect and report touch inputs at an extended touch point or area of touch-sensitive screen 52, based at least in part on the extent of virtual finger 64, while mobile computing device 50 is in the extended touch input mode of operation. Except for the support of the extended touch input mode of operation, OS 112, including touch input driver 122, may be any one of a number of operating systems with touch input support known in the art.

Application 114 may be any number of mobile applications that can use and process touch inputs. FW/BIOS 106, likewise, may be any one of a number FW/BIOS known in the art.

Processor(s) 102 may any one of a number of processors known in the art, having one or more processor cores. Memory 104 may be any known volatile or non-volatile memory known in the art, suitable for storing data. Memory 104 may include a hierarchy of cache memory and system memory. Both the cache and system memory may be respectively organized into cache pages and memory pages. I/O devices 108 may include touch-sensitive screen 52. Additionally, I/O devices 108 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, and so forth.

Figure 3:
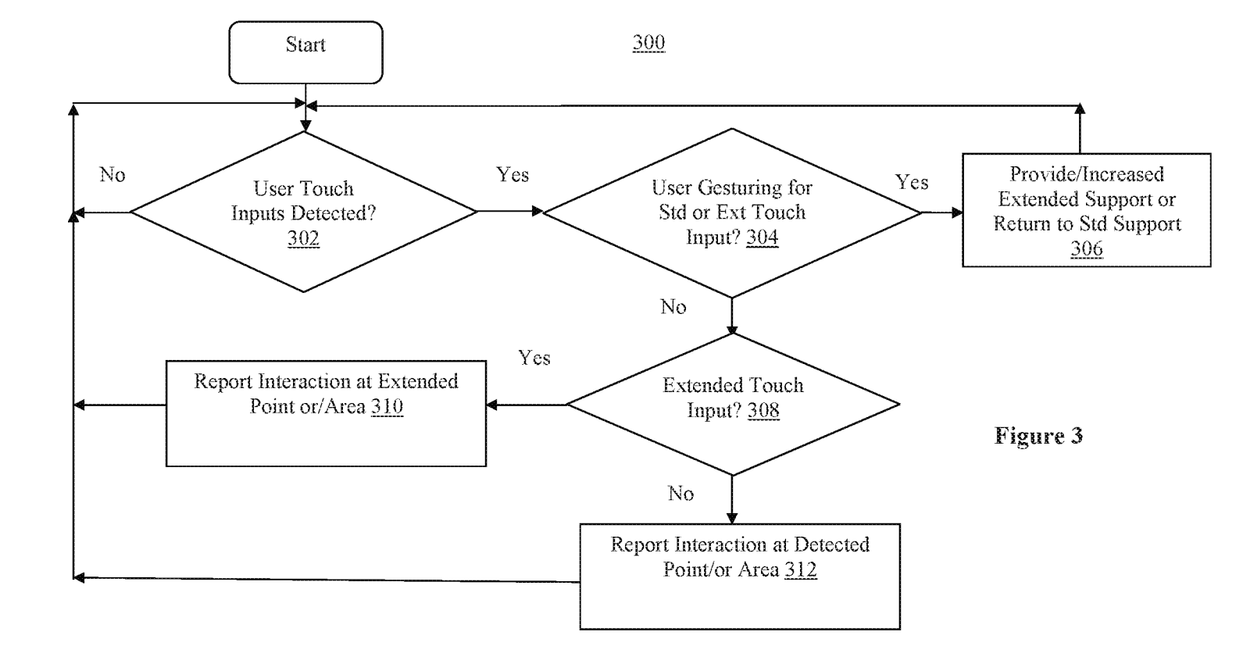
FIG. 3 illustrates an example process for providing extended user touch inputs; according to various embodiments.

Referring now FIG. 3, wherein an example process for providing extended user touch inputs; according to various embodiments, is illustrated. As shown, process 300 for providing extended user touch inputs may include operations at blocks 302-312. The operations may be performed e.g., by touch input driver 122 of FIG. 2. In alternate embodiments, some of the operations at blocks 302-312 may be split, combined or omitted. Still in other embodiments, process 300 may be practiced with additional operations.

As shown, during operation, process 300 may start at block 302. At block 302, a determination may be performed on whether user touch inputs were detected. If no user touch inputs were detected, process 300 may remain and loop in block 302 until user touch inputs are detected or until the mobile computing device goes into a sleep mode or power off. Process 300 may terminate when the mobile computing device goes into a sleep mode or power off.

On detection of user touch inputs, process 300 may proceed to block 304. At block 304, a determination may be performed on whether the user has gestured for transition from the standard mode of operation to the extended touch input mode of operation or vice versa. As described earlier, these user gestures may include the user moving/sweeping his/her finger in a predetermined manner for a predetermined amount of time.

On detection of a user gesture to transition from the standard mode of operation to the extended touch input mode of operation or vice versa, process 300 may proceed to block 306. At block 306, process 300 may enter the extended touch input mode of operation from the standard touch input mode of operation, if the user gesture to transition is detected while in the standard touch input mode. Conversely, process 300 may return to the standard touch input mode of operation from the extended touch input mode of operation from, if the user gesture to transition is detected while in the extended touch input mode.

As described earlier, on entry into the extended touch input mode of operation, a visual aid, such as the earlier described virtual finger, may be displayed to facilitate the user in making touch inputs at an extend point or area of the touch-sensitive screen. In embodiments, the visual aid (virtual finger) may initially be provided with an initial or default extent. The extent of the visual aid (virtual finger) may be further increased proportional to the continuing gesturing by the user beyond the initial threshold amount to trigger entry into the extended touch input mode of operation. For example, the virtual finger may initially be displayed with an extent of 1 inch in response to the user sweeping over a point or area of the touch-sensitive screen, without tapping/clicking, for 2 seconds, and then with the extent increased by 0.1 of an inch for every 1/10 of a second the user continues to sweep over the point or area of the touch-sensitive screen, without tapping/clicking. In other words, a user may trigger entry into the extended touch input mode of operation with the provision of a virtual finger of 1.5 inches when the user sweep over the point or area of the touch-sensitive screen, without tapping/clicking, for a total of 2.5 seconds (first for 2 seconds to trigger the initial entry and the initial extent, and then for 0.5 additional seconds to increase the extent). In embodiments, user gestures to shorten the extent provided may also be supported. In embodiments, the user may perform a gesture that is inverse to the gesture that increases the length of the extent. For example, if the gesture to increase the length of the extent is continuous clockwise circling of the user's finger, the user may gesture decrease of the length of the extent through continuous counterclockwise circling of the user's finger.

Conversely, on return to the standard touch input mode of operation from the extended touch input mode of operation, the display of the visual aid (virtual finger) may be removed.

From block 306, process 300 may return to block 302 and continue therefrom as earlier described.

Back at block 304, if the result of the determination indicates that the user touch input detected is not a user gesture to transition from the standard mode of operation to the extended touch input mode of operation or vice versa, process 300 may proceed to block 308. At block 308, a determination may be made on whether extended touch input is being provided. If a result of the determination indicates that extended touch input is being provided, process 300 may proceed to block 310. At block 310, a determination of the extended point or area of the touch-sensitive screen may be made based at least in part on the extent being provided. On determination of the extended point or area of the touch-sensitive screen, a report (e.g., to a registered application) may be made of the detection of the touch input at the extended point or area of the touch-sensitive screen. The reporting may include the type of touch, e.g., tapping/clicking, sweeping, circling, flicking and so forth. Thereafter, process 300 may return to block 302 and continue therefrom as earlier described.

However, if a result of the determination indicates that extended touch input is not being provided, process 300 may proceed to block 312. At block 312, a report (e.g., to a registered application) may be made of the detection of the touch input at the actual point or area of the touch-sensitive screen. The reporting may likewise include the type of touch, e.g., tapping/clicking, sweeping, circling, flicking and so forth. Thereafter, process 300 may return to block 302 and continue therefrom as earlier described.

Figure 4:
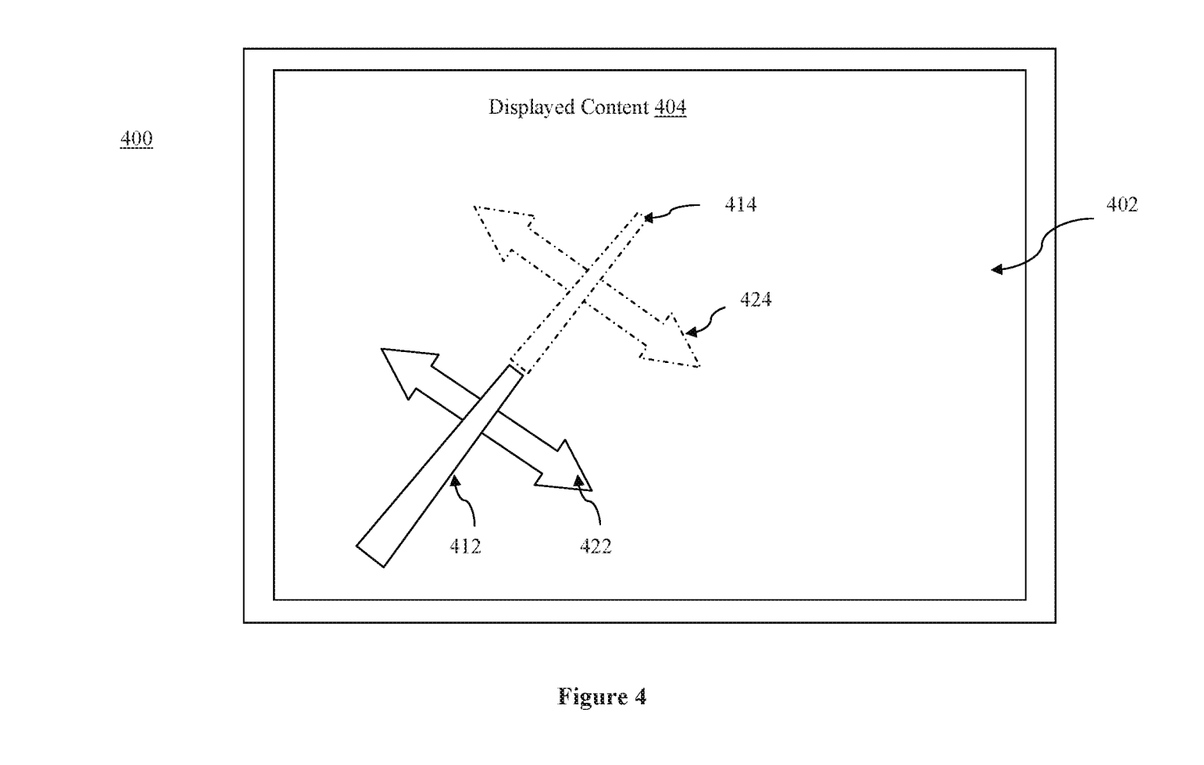
FIG. 4 illustrates a front view of a computing tablet with extended user touch input technology of the present disclosure, according to various embodiments.

While the extended touch input technology of the present disclosure is especially useful for holding a relatively small mobile computing device with one hand and operating the mobile computing device with the same hand, the present disclosure is not so limited. The present disclosure may also be helpful in improving user experience with relatively large computing tablets, such as computing tablets with screen sizes that approach notebook laptop computers or 2-in-1 notebook/laptop computers. Referring now to FIG. 1, wherein a front view of a computing tablet with extended user touch input technology of the present disclosure, according to various embodiments, is depicted. As shown, computing tablet 400 may include a touch-sensitive screen 402. Similar to touch-sensitive screen 52, during operation, touch-sensitive screen 402 may have various output contents 404 of an operating system or applications of computing tablet 400 displayed thereon. Further, touch-sensitive screen 402 may be used to provide user inputs to the operating system and/or applications, through interaction with displayed content 404. Examples of contents 404 may likewise include but are not limited text, graphics, images, and so forth. Some of these text, graphics, images, and so forth, may include links to other text, graphics, and images. Interaction with displayed content 404 may include e.g., single or double tapping with a digitizer or stylus 412 at various surface points or areas of touch-sensitive screen 402, sliding 422 back and forth or otherwise making various gestures such as circling, flicking, and so forth, with digitizer or stylus 412, over various surface areas of touch-sensitive screen 402.

Additionally, computing tablet 400 may support a standard touch input mode of operation and an extended touch input mode of operation. While in the standard touch input mode of operation, touch inputs, sweepings 422, tapping, and so forth, may be detected and reported as in the prior art, that is, as touch inputs at the actual touch point or area of touch-sensitive screen 402. However, while in the extended touch input mode of operation, a visual aid, such as virtual digitizer or stylus 414, may be displayed. Further, touch inputs, sweepings 424, tapping, and so forth, may be detected and reported as touch inputs at an extended touch point or area of touch-sensitive screen 402, based at least in part on the extent of virtual digitizer or stylus 414.

In embodiments, computing tablet 400 may operate by default in the standard touch input mode of operation, and enter into the extended touch input mode of operation, in response to the user making a predetermined gesture for a predetermined amount of time. Similarly, computing tablet 400 may exit the extended touch input mode of operation, and return to the standard touch input mode of operation, in response to the user making a predetermined gesture for a predetermined amount of time.

Similar to the virtual finger 64 of mobile computing device 50, in embodiments, the visual aid (virtual digitizer or stylus 714) may initially be provided with an initial or default extent. The extent of the visual aid (virtual digitizer or stylus 714) may likewise be further increased proportional to the continuing gesturing by the user beyond the initial threshold amount to trigger entry into the extended touch input mode of operation. In embodiments, user gestures to shorten the extent provided, as earlier described, may likewise be supported.

Similar to mobile computing device 50, computing tablet 400 may include hardware/software components, including a touch driver, as depicted and described with references to FIG. 2. And the touch driver may have similar operational logic as the operational flow described with references to FIG. 3.

Accordingly, with the extended touch input support, a user of computing tablet 400 may reduce an amount of reaching when working with computing tablet 400 that is a relatively large computing tablet.

In embodiments, both virtual finger and virtual digitizer/stylus, or other form of extension visual aids may be supported. For these embodiments, support may be provided for a user to configure or select the extension visual aid to be displayed. Similarly, in embodiments, multiple predetermined user gestures and/or gesture durations may be supported for a user to trigger entry into or exit from the extended touch input mode of operation, or increase/decrease the amount of extension provided. For these embodiments, likewise, support may be provided for a user to configure or select the predetermined user gesture and/or gesture duration to trigger entry into or exit from the extended touch input mode of operation, or increase/decrease the amount of extension provided.

Figure 5:
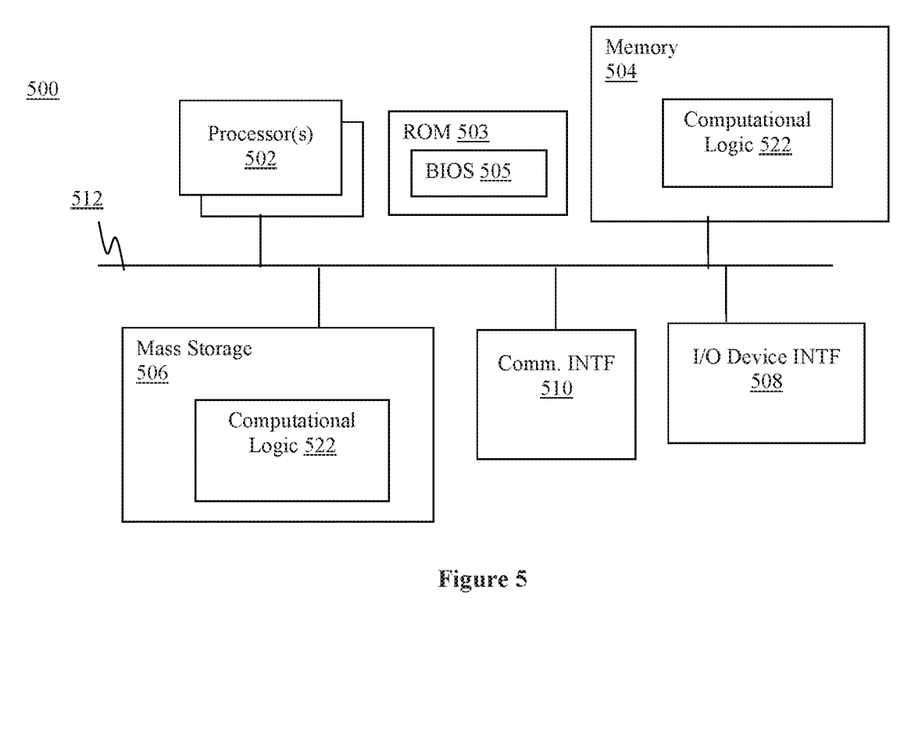
FIG. 5 illustrates an architectural view of an example mobile computing device suitable for use to practice various aspects of the present disclosure, according to the disclosed embodiments.

FIG. 5 illustrates an example computer system that may be suitable for use as mobile computing device to practice selected aspects of the present disclosure. As shown, computer 500 may include one or more processors or processor cores 502, and system memory 504. For the purpose of this application, including the claims, the term "processor" refers to physical processors, and the terms "processor" and "processor cores" may be considered synonymous, unless the context clearly requires otherwise. Additionally, computer 500 may include mass storage devices 506 (solid state storage devices), input/output devices 508 (such as touch-sensitive screen 52) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions of OS 112, including touch input driver 122, and application 114 collectively referred to as computational logic 522. The various elements may be implemented by assembler instructions supported by processor(s) 502 or high-level languages, such as, for example, C, that can be compiled into such instructions.

The number, capability and/or capacity of these elements 510-512 may vary, depending on the design point of computer 500. Otherwise, the constitutions of elements 510-512 are known, and accordingly will not be further described.

Figure 6:
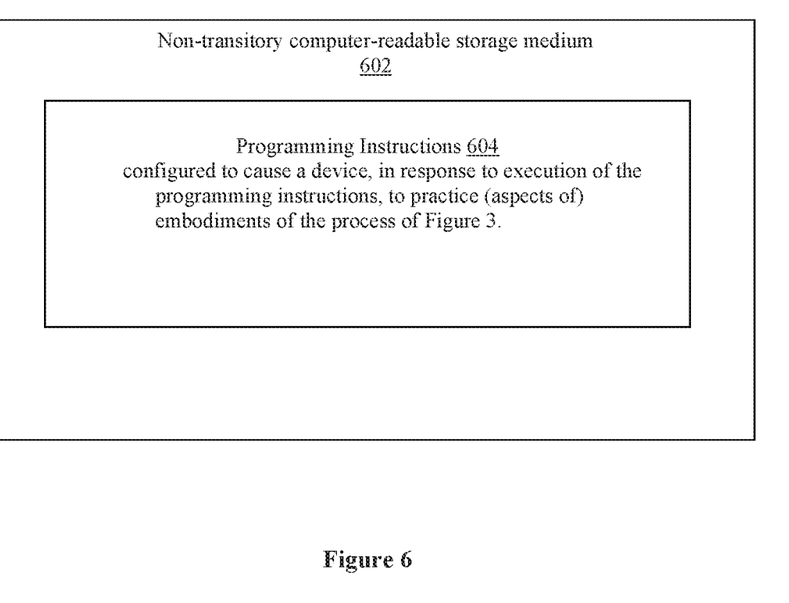
FIG. 6 illustrates a storage medium having instructions for practicing methods described with references to FIG. 3, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to perform, e.g., various operations associated with OS 112, including touch input driver 112. In alternate embodiments, programming instructions 604 may be disposed on multiple computer-readable non-transitory storage media 602 instead. In alternate embodiments, programming instructions 604 may be disposed on computer-readable transitory storage media 602, such as, signals.

Any combination of one or more computer usable or computer readable media may be utilized. The computer-usable or computer-readable medium/media may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer- usable or computer-readable medium/media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer- usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures, For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, at least one of processors 502 may be packaged together with memory having at least some of computational logic 522, e.g., touch input driver 122 (in lieu of storing on memory 504 and storage 506). For one embodiment, at least one of processors 502 may be packaged together with memory having at least some of computational logic 522 to form a System in Package (SIP). For one embodiment, at least one of processors 502 may be integrated on the same die with memory having at least some of computational logic 522. For one embodiment, at least one of processors 502 may be packaged together with memory having at least some of computational logic 522 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for computing, comprising: one or more processors; a touch-sensitive screen coupled with the one or more processors; and a touch input driver to be operated by the one or more processors to detect and report user touch inputs through the touch-sensitive screen, wherein the touch input driver may further provide support for user touch input at an extended point or area of the touch-sensitive screen beyond an actual touch point or area of the touch-sensitive screen.

Example 2 may be example 1, wherein to provide support for user touch input at an extended point or area of the touch-sensitive screen beyond an actual touch point or area of the touch-sensitive screen, the touch input driver may detect for a user gesture to enable user touch input at an extended point or area of the touch-sensitive screen.

Example 3 maybe example 2; wherein the user gesture may include a user moving one of his or her fingers or a stylus over an actual point or area of the touch-sensitive screen in a predetermined manner for a predetermined amount of time.

Example 4 may be example 2, wherein to enable user touch input at an extended point or area of the touch-sensitive screen, the touch input driver may display a virtual finger or stylus extending from the point or area of the touch-sensitive screen where the user gesture was detected, to the extended point or area of the touch-sensitive screen.

Example 5 may be example 2, wherein to provide support for user touch input at an extended point or area of the touch-sensitive screen beyond an actual touch point or area of the touch-sensitive screen, the touch input driver may detect for a continuance of the user gesture to further extend the extended point or area of the touch-sensitive screen where the user may provide touch input.

Example 6 may be example 5; wherein the continuance of the user gesture may include a user continues to move one of his or her finger or stylus over an actual point or area of the touch-sensitive screen in a predetermined manner beyond an initial predetermined amount of time.

Example 7 may be example 5, wherein to further extend the extended point or area of the touch-sensitive screen where the user may provide touch input, the touch input driver may increase a displayed virtual finger or stylus extending from an actual point or area of the touch-sensitive screen where the user gesture was detected, to a farther extended point or area of the touch-sensitive screen, corresponding to the continued movement of the user's finger or stylus.

Example 8 may be any one of examples 1-7, wherein to provide support for user touch input at an extended point or area of the touch-sensitive screen beyond an actual touch point or area of the touch-sensitive screen, the touch input driver may detect for user touch input at an actual point or area of the touch-sensitive screen, determine the extended point or area of the touch-sensitive screen, and report the touch input at the extended point or area of the touch-sensitive screen, when extended touch input is enabled.

Example 9 maybe example 8, wherein the touch input driver may determine the extended point or area of the touch-sensitive screen, based at least in part on an extent of a displayed virtual finger or stylus.

Example 10 may be example 8, wherein the apparatus may be a mobile computing device or a computing tablet.

Example 11 may be a method for computing, comprising: detecting, by a touch input driver of a computing device, user touch inputs through a touch-sensitive screen of the computing device; and reporting, by the touch input driver, detected user touch inputs at actual touch points or areas of the touch-sensitive screen, when extend user touch input is not enabled, or reporting, by the touch input driver, detected user touch inputs at extended touch points or areas of corresponding actual touch points or areas of the touch-sensitive screen, when extend user touch input is enabled.

Example 12 may be example 11, further comprising detecting, by the touch input driver, a user gesture to enable user touch input at an extended point or area of the touch-sensitive screen.

Example 13 may be example 12; wherein the user gesture may include a user moving one of his or her fingers or a stylus over an actual point or area of the touch-sensitive screen in a predetermined manner for a predetermined amount of time.

Example 14 may be example 12, further comprising on enablement of user touch input at an extended point or area of the touch-sensitive screen, displaying, by the touch input driver, a virtual finger or stylus extending from the point or area of the touch-sensitive screen where the user gesture was detected, to the extended point or area of the touch-sensitive screen.

Example 15 may be example 12, further comprising detecting, by the touch input driver, for a continuance of the user gesture to further extend the extended point or area of the touch-sensitive screen where the user may provide touch input.

Example 16 may be example 15; wherein the continuance of the user gesture may include a user continues to move one of his or her finger or stylus over an actual point or area of the touch-sensitive screen in a predetermined manner beyond an initial predetermined amount of time.

Example 17 may be example 15, wherein to further extend the extended point or area of the touch-sensitive screen where the user may provide touch input, the method may further include the touch input driver increasing a displayed virtual finger or stylus extending from an actual point or area of the touch-sensitive screen where the user gesture was detected, to a farther extended point or area of the touch-sensitive screen, corresponding to the continued movement of the user's finger or stylus.

Example 18 may be any one of examples 11-17, further comprising detecting, by the touch input driver, for user touch input at an actual point or area of the touch-sensitive screen, determining the extended point or area of the touch-sensitive screen, and reporting the touch input at the extended point or area of the touch-sensitive screen, when extended touch input is enabled.

Example 19 may be example 18, wherein determining may include determining the extended point or area of the touch-sensitive screen, based at least in part on an extent of a displayed virtual finger or stylus.

Example 20 may be one or more computer-readable media comprising instructions that cause a mobile computing device, in response to execution of the instructions by one or more processors of the mobile computing device, to provide a touch input driver, to detect and report user touch inputs through a touch-sensitive screen of the mobile computing device, wherein the touch input driver may further provide support for user touch input at an extended point or area of the touch-sensitive screen beyond an actual touch point or area of the touch-sensitive screen.

Example 21 may be example 20, wherein to provide support for user touch input at an extended point or area of the touch-sensitive screen beyond an actual touch point or area of the touch-sensitive screen, the touch input driver may detect for a user gesture to enable user touch input at an extended point or area of the touch-sensitive screen.

Example 22 may be example 21; wherein the user gesture may include a user moving one of his or her fingers or a stylus over an actual point or area of the touch-sensitive screen in a predetermined manner for a predetermined amount of time.

Example 23 may be example 21, wherein to enable user touch input at an extended point or area of the touch-sensitive screen, the touch input driver may display a virtual finger or stylus extending from the point or area of the touch-sensitive screen where the user gesture was detected, to the extended point or area of the touch-sensitive screen.

Example 24 may be example 21, wherein to provide support for user touch input at an extended point or area of the touch-sensitive screen beyond an actual touch point or area of the touch-sensitive screen, the touch input driver may detect for a continuance of the user gesture to further extend the extended point or area of the touch-sensitive screen where the user may provide touch input.

Example 25 may be example 24; wherein the continuance of the user gesture may include a user continues to move one of his or her finger or stylus over an actual point or area of the touch-sensitive screen in a predetermined manner beyond an initial predetermined amount of time.

Example 26 may be example 24, wherein to further extend the extended point or area of the touch-sensitive screen where the user may provide touch input, the touch input driver may increase a displayed virtual finger or stylus extending from an actual point or area of the touch-sensitive screen where the user gesture was detected, to a farther extended point or area of the touch-sensitive screen, corresponding to the continued movement of the user's finger or stylus.

Example 27 may be any one of examples 20-26, wherein to provide support for user touch input at an extended point or area of the touch-sensitive screen beyond an actual touch point or area of the touch-sensitive screen, the touch input driver may detect for user touch input at an actual point or area of the touch-sensitive screen, determine the extended point or area of the touch-sensitive screen, and report the touch input at the extended point or area of the touch-sensitive screen, when extended touch input is enabled.

Example 28 may be example 27, wherein the touch input driver may determine the extended point or area of the touch-sensitive screen, based at least in part on an extent of a. displayed virtual finger or stylus.

Example 29 may be an apparatus for computing, comprising: means for detecting user touch inputs through a touch-sensitive screen of the apparatus; and means for reporting detected user touch inputs at actual touch points or areas of the touch-sensitive screen, when extend user touch input is not enabled, or reporting detected user touch inputs at extended touch points or areas of corresponding actual touch points or areas of the touch-sensitive screen, when extend user touch input is enabled.

Example 30 may be example 29, further comprising means for detecting a user gesture to enable user touch input at an extended point or area of the touch-sensitive screen.

Example 31 may be example 30; wherein the user gesture may include a user moving one of his or her fingers or a stylus over an actual point or area of the touch-sensitive screen in a predetermined manner for a predetermined amount of time.

Example 32 may be example 30, further comprising means for, on enablement of user touch input at an extended point or area of the touch-sensitive screen, displaying a virtual finger or stylus extending from the point or area of the touch-sensitive screen where the user gesture was detected, to the extended point or area of the touch-sensitive screen.

Example 33 may be example 30, further comprising means for detecting for a continuance of the user gesture to further extend the extended point or area of the touch-sensitive screen where the user may provide touch input.

Example 34 may be example 33; wherein the continuance of the user gesture may include a user continues to move one of his or her finger or stylus over an actual point or area of the touch-sensitive screen in a predetermined manner beyond an initial predetermined amount of time.

Example 35 may be example 33, wherein to further extend the extended point or area of the touch-sensitive screen where the user may provide touch input, the apparatus may further include means for increasing a displayed virtual finger or stylus extending from an actual point or area of the touch-sensitive screen where the user gesture was detected, to a farther extended point or area of the touch-sensitive screen, corresponding to the continued movement of the user's finger or stylus.

Example 36 may be example 29-35, further comprising means for detecting for user touch input at an actual point or area of the touch-sensitive screen, means for determining the extended point or area of the touch-sensitive screen, and means for reporting the touch input at the extended point or area of the touch-sensitive screen, when extended touch input is enabled.

Example 37 may be example 36, wherein means for determining may include means for determining the extended point or area of the touch-sensitive screen, based at least in part on an extent of a displayed virtual finger or stylus.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claim and its equivalents.

What is claimed is:

1. An apparatus for computing, comprising:
   one or more processors;
   a touch-sensitive screen coupled with the one or more processors; and
   a touch input driver to be operated by the one or more processors to detect and report user touch inputs through the touch-sensitive screen, wherein the touch input driver is to further provide support for user touch input at an extended point or area of the touch-sensitive screen using a virtual finger or stylus with a variable extent that variably extends from an actual touch point or area of the touch-sensitive screen to the extended point or area of the touch-sensitive screen, based at least in part on user gesture;
   wherein to provide support for user touch input at the extended point or area of the touch-sensitive screen beyond the actual touch point or area of the touch-sensitive screen, the touch input driver is to detect for a user gesture to enter into an extended touch input mode with the virtual finger or stylus initially provided with an initial or default extent to enable user touch input at an initial extended point or area of the touch-sensitive screen, and to detect continuance of the user gesture to further increase the extent proportionally to the extended point or area of the touch-sensitive screen.

2. The apparatus of claim 1; wherein the user gesture comprises a user moving one of his or her fingers or a stylus over the actual touch point or area of the touch-sensitive screen in a predetermined manner for a predetermined amount of time.

3. The apparatus of claim 1, wherein the continuance of the user gesture comprises a user continues to move one of his or her finger or stylus over the actual point or area of the touch-sensitive screen in a predetermined manner beyond an initial predetermined amount of time.

4. The apparatus of claim 1, wherein to provide support for user touch input at the extended point or area of the touch-sensitive screen beyond the actual touch point or area of the touch-sensitive screen, the touch input driver is to detect for user touch input at an actual point or area of the touch-sensitive screen, determine the extended point or area of the touch-sensitive screen, and report the touch input at the extended point or area of the touch-sensitive screen, when extended touch input is enabled.

5. The apparatus of claim 4, wherein the touch input driver is to determine the extended point or area of the touch-sensitive screen, based at least in part on the extent of a displayed virtual finger or stylus.

6. The apparatus of claim 1, wherein the apparatus is a mobile computing device or a computing tablet.

7. A method for computing, comprising:
- detecting, by a touch input driver of a computing device, user touch inputs through a touch-sensitive screen of the computing device;
- detecting, by the touch input driver, for a user gesture to enter into an extended touch input mode with a virtual finger or stylus initially provided with an initial or default extent to enable user touch input at an initial extended point or area from an actual point or area of the touch-sensitive screen;
- detecting, by the touch input driver, continuance of the user gesture to further increase the extent proportionally to a further extended point or area of the touch-sensitive screen beyond the initial extended point or area;
- detecting, by the touch input driver, touching of the further extend point or area of the touch-sensitive screen with the virtual finger or stylus; and
- reporting, by the touch input driver, detected user touch input at the further extended touch point or area of the touch-sensitive screen.

8. The method of claim 7; wherein the user gesture comprises a user moving one of his or her fingers or a stylus over the actual point or area of the touch-sensitive screen in a predetermined manner for a predetermined amount of time.

9. The method of claim 7,
- wherein the continuance of the user gesture comprises a user continues to move one of his or her finger or stylus over the actual point or area of the touch-sensitive screen in a predetermined manner beyond an initial predetermined amount of time.

10. The method of claim 7, further comprising detecting, by the touch input driver, for a user gesture to exit the extended touch input mode, and return to a standard touch input mode; detecting, by the touch input driver, for user touch input at the actual point or area of the touch-sensitive screen, and reporting the user touch input at the actual point or area of the touch-sensitive screen.

11. One or more non-transitory computer-readable media comprising instructions that cause a mobile computing device, in response to execution of the instructions by one or more processors of the mobile computing device, to provide a touch input driver, to detect and report user touch inputs through a touch-sensitive screen of the mobile computing device, wherein the touch input driver is to further provide support for user touch input at an extended point or area of the touch-sensitive screen using a virtual finger or stylus with a variable extent that variably extends from an actual touch point or area of the touch-sensitive screen to the extended point or area of the touch-sensitive screen;
- wherein to provide support for user touch input at the extended point or area of the touch-sensitive screen beyond the actual touch point or area of the touch-sensitive screen, the touch input driver is to detect for a user gesture to enter into an extended touch input mode with the virtual finger or stylus initially provided with an initial or default extent to enable user touch input at an initial extended point or area of the touch-sensitive screen, and to detect continuance of the user gesture to further increase the extent proportionally to the extended point or area of the touch-sensitive screen.

12. The one or more non-transitory computer-readable media of claim 11; wherein the user gesture comprises a user moving one of his or her fingers or a stylus over the actual point or area of the touch-sensitive screen in a predetermined manner for a predetermined amount of time.

13. The one or more non-transitory computer-readable media of claim 11; wherein the continuance of the user gesture comprises a user continues to move one of his or her finger or stylus over the actual point or area of the touch-sensitive screen in a predetermined manner beyond an initial predetermined amount of time.

14. The one or more non-transitory computer-readable media of claim 11, wherein to further extend the extended point or area of the touch-sensitive screen where the user may provide touch input, the touch input driver is to increase the displayed virtual finger or stylus further extending from the actual point or area of the touch-sensitive screen where the user gesture was detected, to an even farther extended point or area of the touch-sensitive screen, corresponding to the continued movement of the user's finger or stylus.

* * * * *